(12) United States Patent
Ito

(10) Patent No.: US 9,842,199 B2
(45) Date of Patent: Dec. 12, 2017

(54) INFORMATION PROCESSING SYSTEM, METHOD OF CONTROLLING THE SYSTEM, INFORMATION PROCESSING APPARATUS, WEB SERVER, AND STORAGE MEDIUM

(71) Applicant: CANON KABUSHIKI KAISHA, Tokyo (JP)

(72) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 14/792,914

(22) Filed: Jul. 7, 2015

(65) Prior Publication Data

US 2016/0026777 A1 Jan. 28, 2016

(30) Foreign Application Priority Data

Jul. 23, 2014 (JP) .................................. 2014-150134

(51) Int. Cl.
*G06F 7/04* (2006.01)
*G06F 21/10* (2013.01)
*G06F 21/60* (2013.01)
*H04L 29/06* (2006.01)

(52) U.S. Cl.
CPC .......... *G06F 21/105* (2013.01); *G06F 21/608* (2013.01); *G06F 2221/0704* (2013.01); *G06F 2221/0773* (2013.01); *H04L 63/102* (2013.01)

(58) Field of Classification Search
CPC ................ G06F 21/105; G06F 21/608; G06F 2221/0704; G06F 2221/0773; H04L 63/102

USPC .......................................................... 726/29
See application file for complete search history.

(56) References Cited

U.S. PATENT DOCUMENTS

| 7,685,521 | B1 | 3/2010 | Ueda et al. |
| 7,752,140 | B1 * | 7/2010 | Xu ................. G06F 21/121 705/59 |
| 8,400,658 | B2 | 3/2013 | Ito |
| 8,947,699 | B2 | 2/2015 | Ito |
| 9,148,529 | B2 | 9/2015 | Ito |
| 9,172,724 | B1 * | 10/2015 | Reddy ................... H04L 63/20 |
| 2011/0208809 | A1 | 8/2011 | Ito |

(Continued)

FOREIGN PATENT DOCUMENTS

JP 2011-123677 A 6/2011

*Primary Examiner* — Mohammad W Reza
(74) *Attorney, Agent, or Firm* — Fitzpatrick, Cella, Harper & Scinto

(57) ABSTRACT

In an information processing apparatus, upon the calling of a web application being instructed, the information processing apparatus sets a URL corresponding to the web application in the web browser and makes a request to the web server, and when a request to perform a confirmation process for the license is received from the web server, the information processing apparatus generates signature information of the information processing apparatus, sends the signature information to the URL, and obtains authorization information from the web server. The web server confirms a license of the information processing apparatus in response to the request from the information processing apparatus, and responds to the information processing apparatus with web application content upon the license of the information processing apparatus being successfully confirmed.

12 Claims, 12 Drawing Sheets

(56) References Cited

U.S. PATENT DOCUMENTS

2012/0113453 A1 5/2012 Ito
2015/0295930 A1* 10/2015 Dixon .................. H04L 63/083
                                                  713/181

* cited by examiner

FIG. 5A

| APPLICATION ID | APPLICATION ENCRYPTION COMMON KEY |
|---|---|
| APP001 | OhVyoiuARmcu...... |
| APP002 | WasilDcQR6dYj...... |
| APP003 | tjoE1ijp321rAeh...... |
| ... | ... |

501 — APPLICATION ID
502 — APPLICATION ENCRYPTION COMMON KEY

FIG. 5B

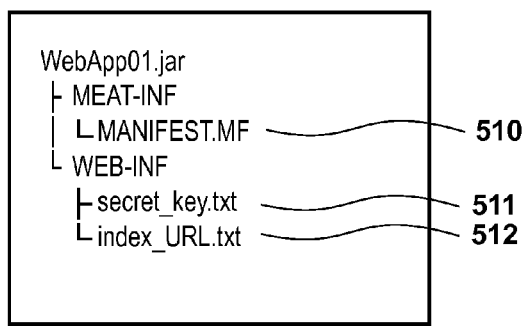

```
WebApp01.jar
├ MEAT-INF
│  └ MANIFEST.MF        ─── 510
└ WEB-INF
   ├ secret_key.txt      ─── 511
   └ index_URL.txt       ─── 512
```

FIG. 5C

| APPLICATION ID | LICENSE ACCESS NUMBER | VALIDITY PERIOD | DEVICE ID | LICENSE ID |
|---|---|---|---|---|
| APP001 | XXX-XXX-101 | UNLIMITED | – | – |
| APP001 | XXX-XXX-102 | UNLIMITED | DEV001 | LIC001 |
| APP002 | XXX-XXX-201 | 60 DAYS | DEV002 | LIC002 |
| ... | ... | ... | ... | ... |

521, 522, 523, 524, 525
526, 527, 528

```
LICENSE ID : LIC002
APPLICATION ID : APP002
DEVICE ID : DEV002
VALIDITY PERIOD : 60
APPLICATION ENCRYPTION COMMON KEY : WasilDcQR6dYj......
```

| TOKEN | DEVICE ID | VALIDITY PERIOD |
|---|---|---|
| aGzv4JOkF0XT5Qx2TIKWIA | DEV001 | 2016/4/3 |
| dQate56GExafdTTEYJUsdfa | DEV002 | 2016/5/3 |
| TNADfy456hhdHEAhear62a | DEV003 | 2016/4/21 |
| … | … | … |

F I G. 12
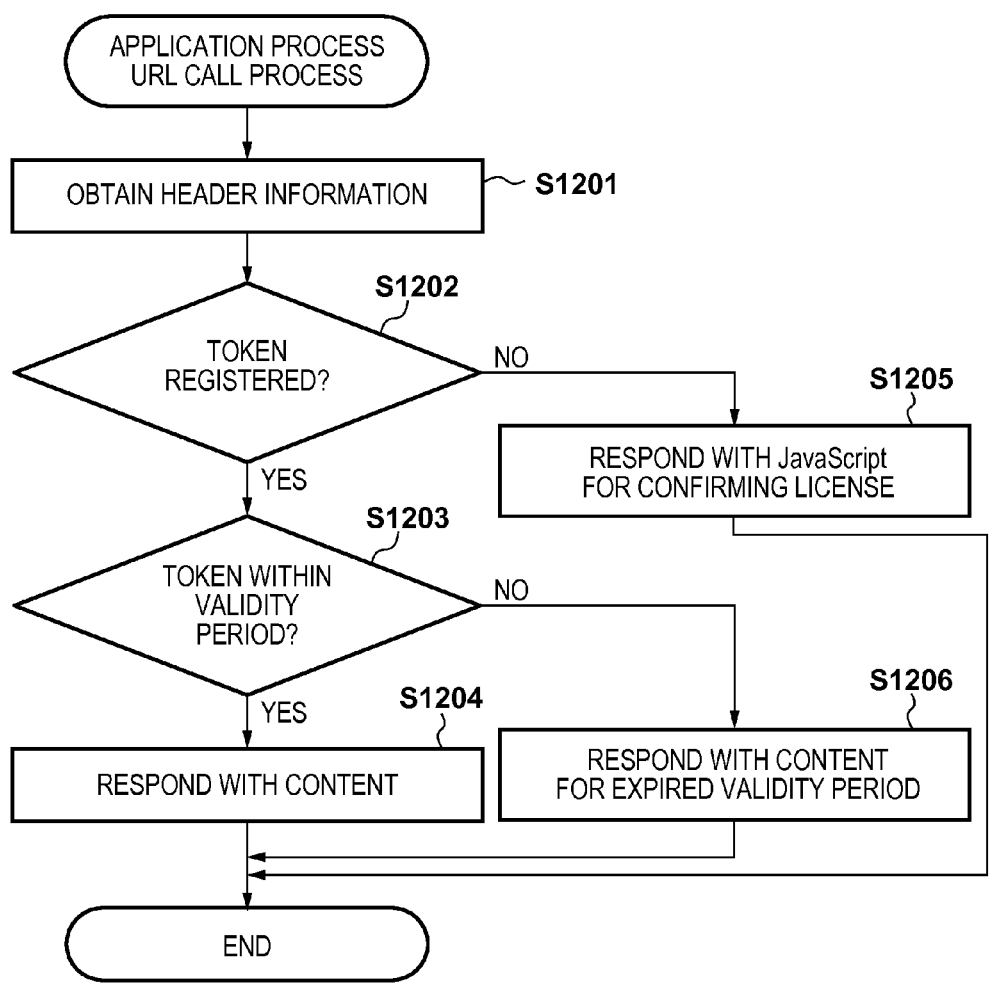

INFORMATION PROCESSING SYSTEM, METHOD OF CONTROLLING THE SYSTEM, INFORMATION PROCESSING APPARATUS, WEB SERVER, AND STORAGE MEDIUM

BACKGROUND OF THE INVENTION

Field of the Invention

The present invention relates to information processing systems, methods of controlling such systems, information processing apparatuses, web servers, and storage medium.

Description of the Related Art

A technique is known in which an information processing apparatus such as a PC displays, using a web browser installed in the information processing apparatus, an operating screen of a web application provided from a web server to which the information processing apparatus is connected over a network, and a user makes operations through the operating screen. See Japanese Patent Laid-Open No. 2011-123677, for example. To use the web application, the user obtains a license for using the web application from a provider of the web application. The operating screen of the web application is then displayed by the web browser of the user's information processing apparatus. As such, a system for the provider of the web application to verify whether or not the connection is being made from a user who has properly purchased a license is necessary. To realize such a system, for example, the operating screen of the web application requests the input of a username and a password, and the user is determined to have properly purchased a license in the case where the username and the password input through that screen match registered information.

Meanwhile, there are also web applications aimed at information processing apparatuses shared by many people, such as multifunction peripherals (MFPs) that have scanning functions, printing functions, and so on. In the case where many people share a single information processing apparatus, web application licenses are sometimes issued for the client terminal as a whole rather than for individual users.

Such license management is not only carried out for respective individual web applications; there are also systems in which license sales and management are collectively carried out by a representative for web applications developed by different web application developers. In such a case, a server having a web application makes an inquiry, on the basis of information from a web browser, to a license management server that manages licenses, and verifies whether or not the license has been properly purchased. There are also methods of verifying licenses by executing a JavaScript program or the like in a web browser and the JavaScript then communicating with the license management server.

It is necessary for a license management server that manages licenses in this manner to be running continually when license confirmation is required, or in other words, when a user attempts to use the web application. In other words, in the case where the license management server manages licenses for a plurality of web applications collectively, it is necessary for the server to run without stopping a service for confirming the license of individual users, which has been problematic in that costs for running the server increase.

SUMMARY OF THE INVENTION

An aspect of the present invention is to eliminate the above-mentioned problems with the conventional technology.

A feature of the present invention is to provide a technique that enables a license of a web application to be verified even without continually inquiring with a license management server.

According to an aspect of the present invention, there is provided an information processing system including an information processing apparatus having a web browser and a web server, wherein the information processing apparatus comprises: a request unit that, upon a web application being instructed to be called, sets a URL corresponding to the web application in the web browser and makes a request to the web server; a generation unit that generates signature information of the information processing apparatus upon a request for a license confirmation process being made from the web server; and an obtaining unit that transmits the signature information to the URL and obtains authorization information from the web server, wherein the web server comprises: a confirmation unit that confirms a license of the information processing apparatus in response to the request from the request unit; a response unit that, upon the license of the information processing apparatus being successfully confirmed by the confirmation unit, returns web application content to the information processing apparatus; and a confirmation requesting unit that requests the information processing apparatus to perform a confirmation process for the license in the case where the license of the information processing apparatus cannot be confirmed by the confirmation unit, and wherein in the case where the confirmation process for the license has been requested, the confirmation unit verifies the signature information and confirms the license of the information processing apparatus, and generates and transmits the authorization information to the information processing apparatus upon the license of the information processing apparatus being successfully confirmed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a diagram illustrating an example of an application management table according to the embodiment.

FIG. 5B is a diagram illustrating the configuration of a dummy application.

FIG. 5C is a diagram schematically illustrating an example of a license management table.

FIG. 12 is a flowchart for describing processing, executed in the case where the web application server has received an HTTP request, that determines whether or not the request is from a properly-registered MFP, according to the embodiment.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Note that this embodiment describes an example of a web application license management system. Furthermore, the embodiment describes an example in which a multifunction peripheral (MFP) in which is installed a web browser application serves as a client terminal that displays a web application. Moreover, it is assumed that the web application license management is carried out for the individual MFP serving as a client terminal.

Figure 1:
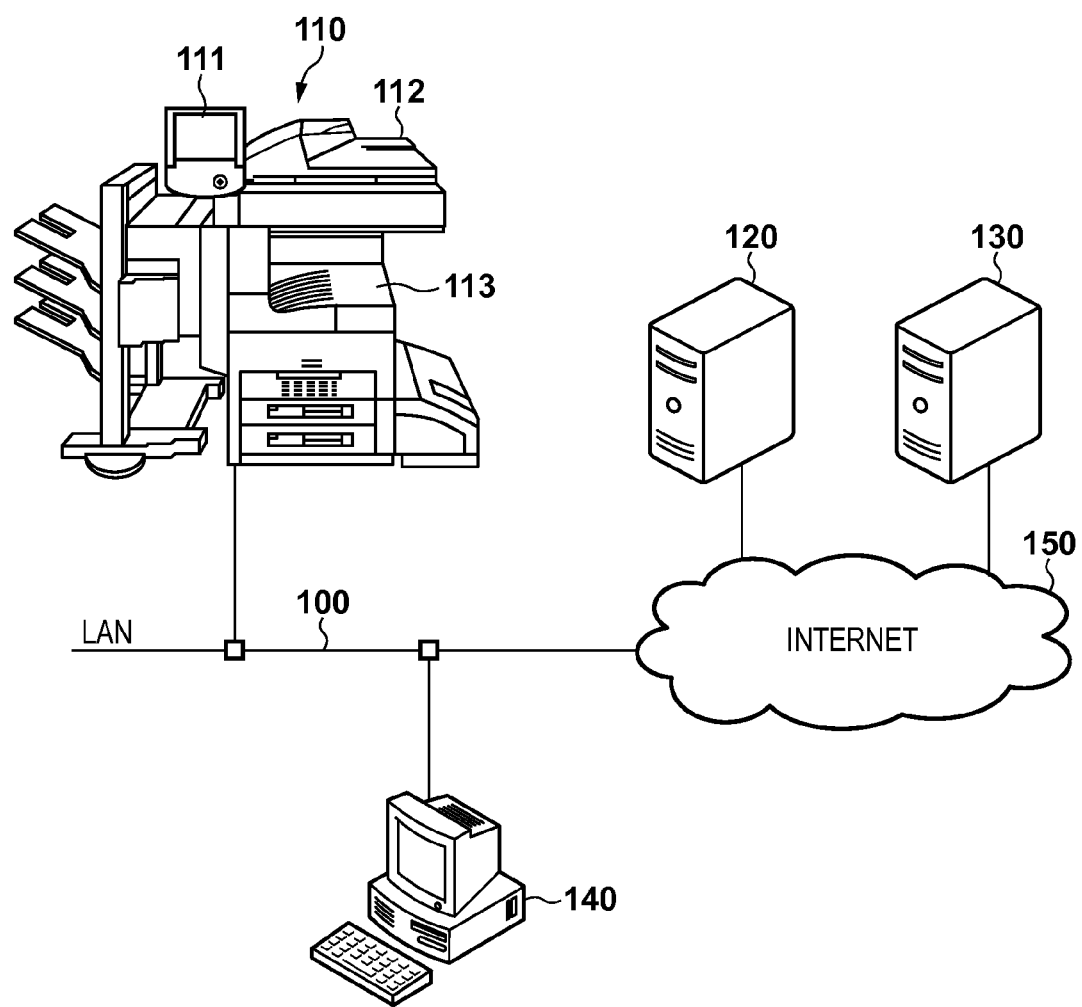
FIG. 1 is a diagram illustrating the overall configuration of an information processing system according to an embodiment of the present invention.

FIG. 1 is a diagram illustrating the overall configuration of an information processing system according to the embodiment of the present invention.

In this information processing system, an MFP 110 and a personal computer (PC) 140 are connected over a LAN 100, and the LAN 100 is connected to the Internet 150. Furthermore, a license management server 120 and a web application server (web server) 130 are connected to the Internet 150.

The MFP 110 is a multifunction peripheral including a console unit 111, a scanner unit 112, and a printer unit 113.

The MFP 110 according to this embodiment functions as a client terminal that displays and runs an operating screen of a web application using an installed web browser. The MFP 110 can print an image obtained from the web application using the printer unit 113 in response to an instruction from the web application, and can read a document using the scanner unit 112 and send image data obtained as a result to the web application. Note that an identifier called a device ID is assigned to the MFP 110 in this embodiment, and each MFP can be specified and recognized uniquely using this identifier.

The license management server 120 is a server that manages licenses of a plurality of different web applications. The web application server 130 is a server that executes web applications. The PC 140 functions as a terminal apparatus for making various types of settings in the MFP 110. Note that the system configuration described thus far is merely one example, and the numbers and so on of these devices are not limited to those described in the present embodiment.

Figure 2:
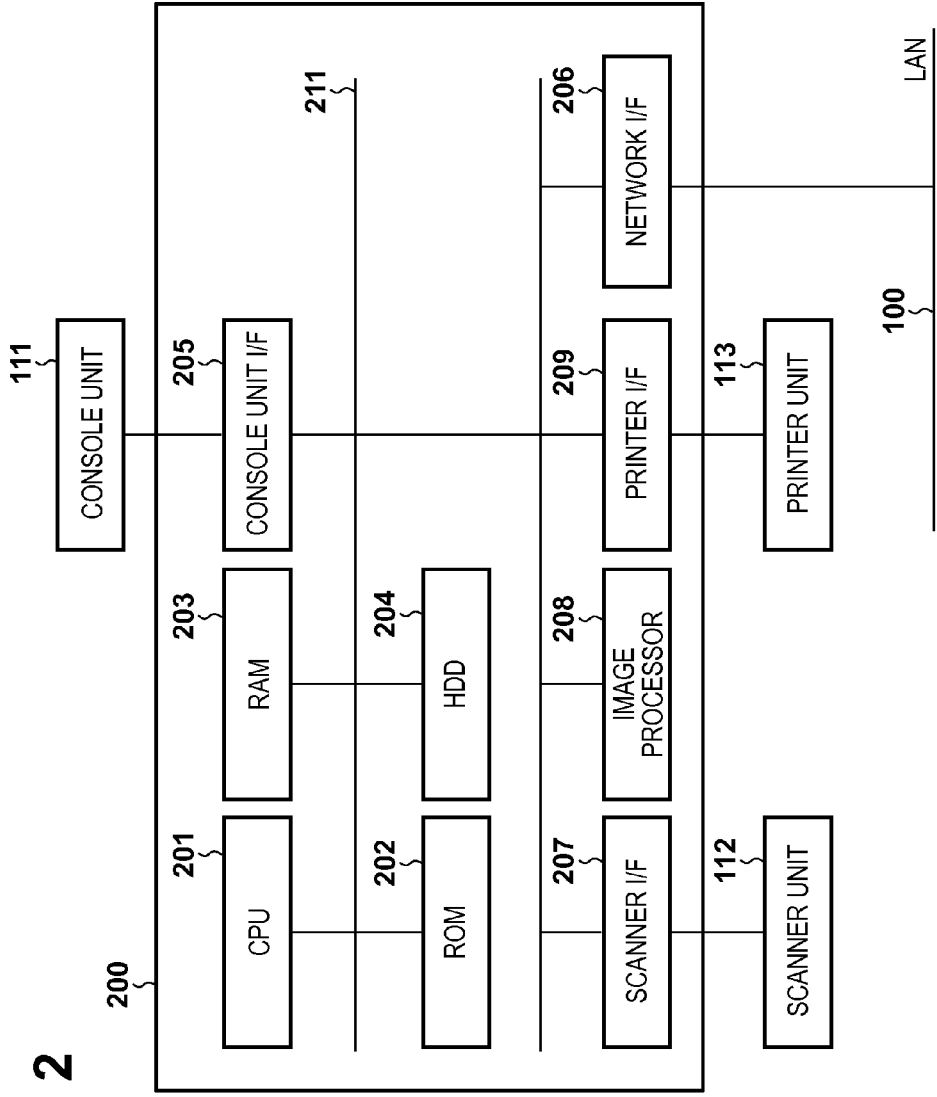
FIG. 2 is a block diagram illustrating the hardware configuration of an MFP according to the embodiment.

FIG. 2 is a block diagram illustrating the hardware configuration of the MFP 110 according to this embodiment.

The console unit 111 includes a display unit having touch panel functionality, various types of physical keys, and so on, displays information to a user in accordance with data from a control unit 200, and inputs information based on user operations to the control unit 200. The scanner unit 112 reads an image of a document, generates image data of that image, and supplies the image data to the control unit 200. The printer unit 113 prints an image based on the image data received from the control unit 200 onto paper.

The control unit 200 is electrically connected to the console unit 111, the scanner unit 112, and the printer unit 113, and is also connected to the LAN 100 via a network interface (I/F) 206. This enables communication using a communication protocol such as TCP/IP over the LAN 100. In the control unit 200, a CPU 201, a ROM 202, a RAM 203, an HDD 204, a console unit I/F 205, the network I/F 206, a scanner I/F 207, an image processor 208, and a printer I/F 209 are connected via a system bus 211. The CPU 201 executes a boot program in the ROM 202, deploys an OS, control programs, and so on stored in the HDD 204 into the RAM 203, and controls the MFP 110 as a whole on the basis of those programs. This control also includes the execution of programs for realizing the flowcharts mentioned later. The boot program of the MFP 110, various types of data, and so on are held in the ROM 202. The RAM 203 provides a work memory used for operations performed by the CPU 201, and also provides an image memory for temporarily storing image data. The HDD 204 is a hard disk drive, and holds the OS, various types of programs, image data, and so on. The console unit I/F 205 is an interface for connecting the system bus 211 and the console unit 111. The network I/F 206 connects the LAN 100 and the system bus 211, and inputs/outputs information via a network. The scanner I/F 207 controls an interface between the scanner unit 112 and the control unit 200. The image processor 208 carries out image processing such as rotation, color conversion, image compression/decompression processes and so on, on image data input from the scanner unit 112 and image data to be output to the printer unit 113. The printer I/F 209 accepts image data processed by the image processor 208 and controls printing performed by the printer unit 113 in accordance with attribute data that accompanies the image data. Although this embodiment describes an example in which the MFP 110 can display a UI using the console unit 111, an information processing apparatus such as a generic computer or the like may be employed instead of the MFP 110.

Figure 3:
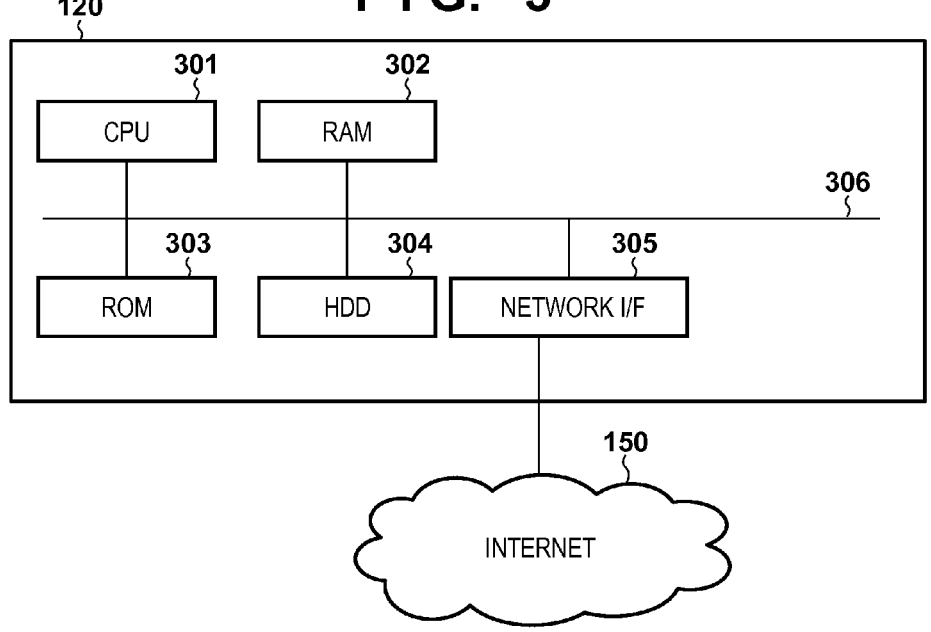
FIG. 3 is a block diagram illustrating the hardware configuration of a license management server according to the embodiment.

FIG. 3 is a block diagram illustrating the hardware configuration of the license management server 120 according to this embodiment.

The license management server 120 includes a CPU 301, a RAM 302, a ROM 303, a hard disk drive (HDD) 304, and a network I/F 305, and these units are communicably connected to each other via a system bus 306. The ROM 303 holds a boot program, and when the server power is turned on, the CPU 301 reads out the boot program and deploys an OS, control programs, and the like installed in the HDD 304 into the RAM 302. The functions of the license management server 120 are realized by the CPU 301 executing the programs deployed into the RAM 302. The CPU 301 also communicates with other devices on the network to which the server is connected via the network I/F 305. The hardware configurations of the web application server 130 and the PC 140 are the same as the hardware configuration of the license management server 120 illustrated in FIG. 3, and thus descriptions thereof will be omitted.

Figure 4:
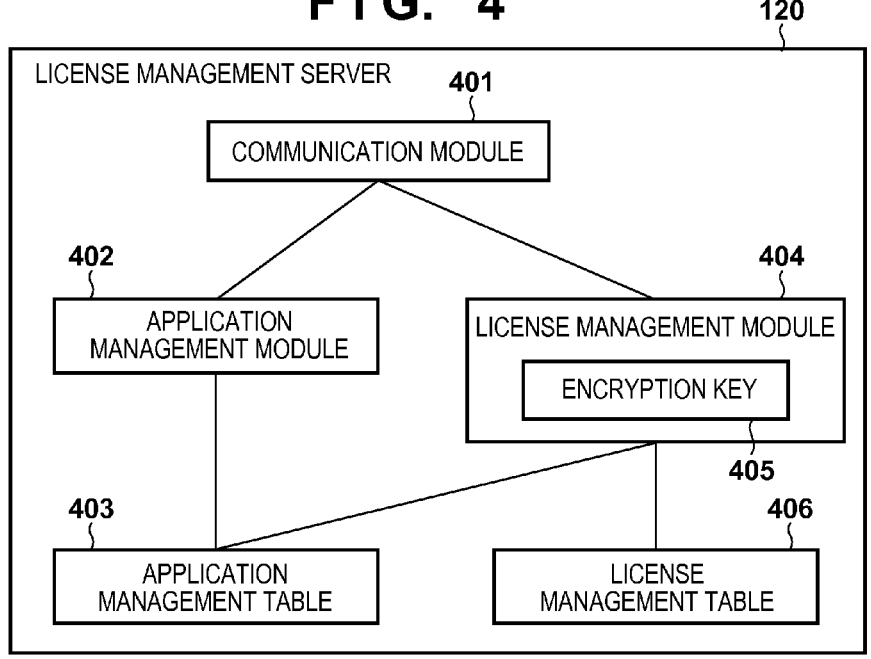
FIG. 4 is a block diagram illustrating the software module configuration of the license management server according to the embodiment.

FIG. 4 is a block diagram illustrating the software module configuration of the license management server 120 according to this embodiment. Programs for realizing these modules are held in the HDD 304 of the license management server 120, and the functions of the modules are realized by deploying those programs into the RAM 302 and executing the programs using the CPU 301.

The license management server 120 according to this embodiment carries out three processes, namely application encryption, issuing licenses for installing applications in individual MFPs, and issuing license access numbers for managing individual licenses. "Application" referred to here indicates one of the following two types of applications. One is an MFP application that can be installed in the MFP 110 and includes an execution file group for a program that can be run on the MFP 110. The other is a dummy application including a configuration file group for registering a web application, which will be described later.

A communication module 401 accepts processing requests by communicating with an external device over a network, and distributes the requests to an application management module 402 and a license management module 404 in accordance with the processing request. The application management module 402 accepts an unencrypted application and encrypts the application. The application management module 402 accepts the applications from an application development vendor through a terminal (not shown) connected to the Internet 150. The application management module 402 then generates an ID for the application and an encryption common key for the application and registers these items in an application management table 403. The application ID is identification information for identifying individual applications. The encryption common key of an application is an encryption key for encrypting the application. The application is encrypted using the encryption common key, and the encrypted application and the ID of that application are sent to the requester. The application management table 403 is a database that stores the application ID and the application encryption common key generated by the application management module 402 in association with each other.

FIG. 5A is a diagram illustrating an example of the application management table 403 according to this embodiment.

Column 501 indicates the application ID and column 502 indicates the application encryption common key.

FIG. 5B is a diagram illustrating the configuration of the dummy application having the configuration file group for registering the web application.

The dummy application has a structure in which hierarchical files and folders are consolidated into a single file. A file 510 is a manifest file for recording a description of the web application. A file 511 is a secret key, of a public key encrypt system, issued by the web application server 130. Note that a public key corresponding to the secret key is contained in software of the web application server 130, which will be described later. A file 512 is a file in which is recorded a URL for using the web application server 130.

Note that unlike the dummy application, the MFP application contains execution files of a program that can be run on the MFP 110.

In the case where the application management module 402 encrypts the application, all files indicated in FIG. 5B aside from the manifest file 510 are encrypted into a single file. By using the encryption function of the application, the application development vendor can prevent third parties from accessing the content of the application. For dummy applications, the encryption can prevent the secret key, which is contained in the content of the application, from being accessed.

The license management module 404 issues licenses for installing the application in respective MFPs, and manages the license access numbers for issuing the licenses. When a request to issue a license access number corresponding to an application being sold is received from a seller who sells the application, the license management module 404 issues the license access number that corresponds to the application ID. That license access number is then registered in a license management table 406. Here, the license access number is a number for uniquely managing a single license for the application, and the seller of the application sells the aforementioned encrypted application along with this license access number. In addition, upon receiving the license access number and the device ID from a purchaser of the application, the license management module 404 issues a license to the purchaser (user). The issuing of a license is a process that creates a license file corresponding to a license access number by referring to the application management table 403 and the license management table 406.

Here, first, the application ID is obtained from the license access number, and the encryption common key of the application is obtained from the application ID. A license ID is then issued, the device ID and license ID are recorded in the license management table 406, and the license file is generated from these pieces of information as a single file. The license file generated in this manner is then encrypted using an encryption key 405 of the license file held within the license management module 404 and sent to the requester. The encryption key 405 of the license file is the public key of the public key encrypt system. Note that the software of the MFP 110, which will be described later, contains the corresponding secret key. The license management table 406 is a database that stores information related to licenses.

FIG. 5C is a diagram schematically illustrating an example of the license management table 406 according to this embodiment.

Column 521 indicates the application ID, column 522 indicates the license access number, and column 523 indicates a validity period, as a number of days, of the license. This number of days indicates for how many days the license is valid from the date when the application is installed in the MFP. Column 524 indicates the device ID (the ID of the MFP in which the application is installed), and column 525 indicates the license ID. Row 526 indicates an example of an application for which the license access number has been issued but the license has not yet been issued, and thus the device ID and the license ID are blank. Row 527 indicates an example of an application for which a license has been issued, where a validity period of unlimited, the device ID (DEV001) and the license ID (LIC001) are registered. Row 528 also indicates an example of an application for which a license has been issued, where a validity period of 60 days, the device ID (DEV002) and the license ID (LIC002) are registered.

In this manner, the ID of the web application and the device ID of the MFP 110 are registered in association with each other in the license management table 406. Accordingly, which application license has been issued to a given MFP can be known by referring to the license management table 406.

Figures 6, 7:
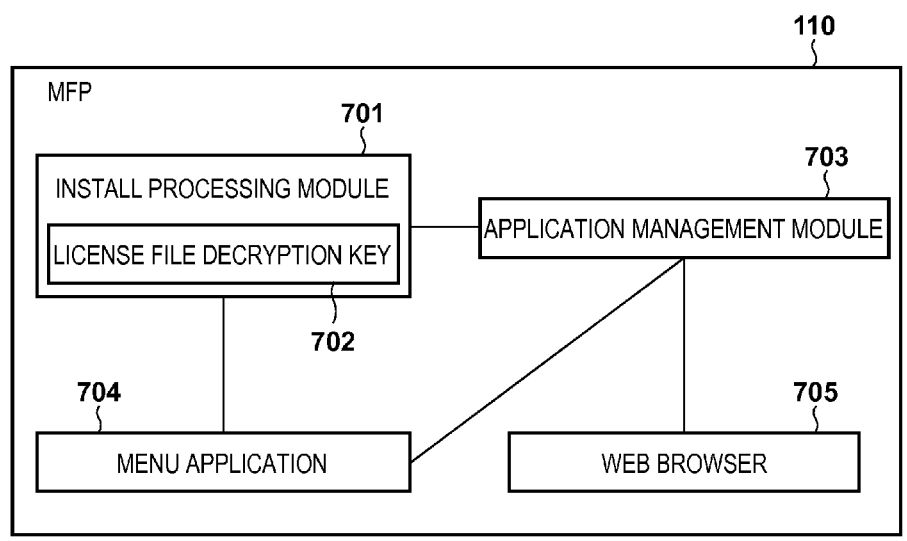
FIG. 6 is a diagram illustrating an example of a license file issued by the license management server according to the embodiment.
FIG. 7 is a diagram illustrating an application and the software module configuration of the MFP according to the embodiment.

FIG. 6 is a diagram illustrating an example of the license file issued by the license management server 120 according to this embodiment.

FIG. 6 indicates an example of a license file corresponding to row 528 in the license management table 406 illustrated in FIG. 5C. Here, the license ID (LIC002), the application ID (APP002), the device ID (DEV002), and the validity period (60 days) are obtained from the details illustrated in FIG. 5C. Meanwhile, the encryption common key (WasiIDcQR6dYj . . . ) for the application (APP002) is obtained from the application management table 403 illustrated in FIG. 5A. In this manner, the license management module 404 generates the license file on the basis of information obtained from the application management table 403 and the license management table 406.

The purchaser of the application is able to obtain the encrypted license file on the basis of the license access number of the purchased application.

FIG. 7 is a diagram illustrating an application and the software module configuration of the MFP 110 according to this embodiment. The application and software modules are held in the HDD 204 of the MFP 110, and are deployed into the RAM 203 upon execution and executed by the CPU 201.

An install processing module 701 controls the installation of an application. The install processing module 701 is connected to the PC 140 via the network I/F 206, and executes the installation of the application in response to an instruction from the PC 140. The install processing module 701 includes a license file decryption key 702 for decrypting the encrypted license file. The license file decryption key 702 corresponds to the aforementioned encryption key 405 of the license file. An application management module 703 manages the applications installed in the MFP 110. A menu application 704 displays a GUI for selecting and executing an application installed in the MFP 110. A web browser 705 communicates with the web application server 130. The web browser 705 sends requests to the web application server 130 using the HTTP protocol, renders HTML data returned as responses to the requests and displays the rendered data on the console unit 111, and analyzes and executes JavaScript returned as a response.

Next, the installation of an application by the purchaser of the application will be described.

Using the PC 140, a user sends the encrypted application and the encrypted license file to the install processing module 701. As a result, the install processing module 701 carries out an installation process for the application. At this time, first, the license file is decrypted using the license file decryption key 702. Then, the encrypted application is decrypted using the encryption common key of the application included in decrypted license file. The application decrypted in this manner is passed to the application management module 703 and saved in the HDD 204. At this time, the device ID recorded in the decrypted license file is compared with the device ID set in advance for the MFP 110, and it is determined whether or not the license file is correct. Furthermore, a date at which the application will expire is calculated from the validity period recorded in the license file and the current date, and is managed by the application management module 703 as an expiry date.

This embodiment assumes that the dummy application having the configuration file group for registering the web application, illustrated in FIG. 5B, is installed in the MFP 110.

Figures 8A, 8B:
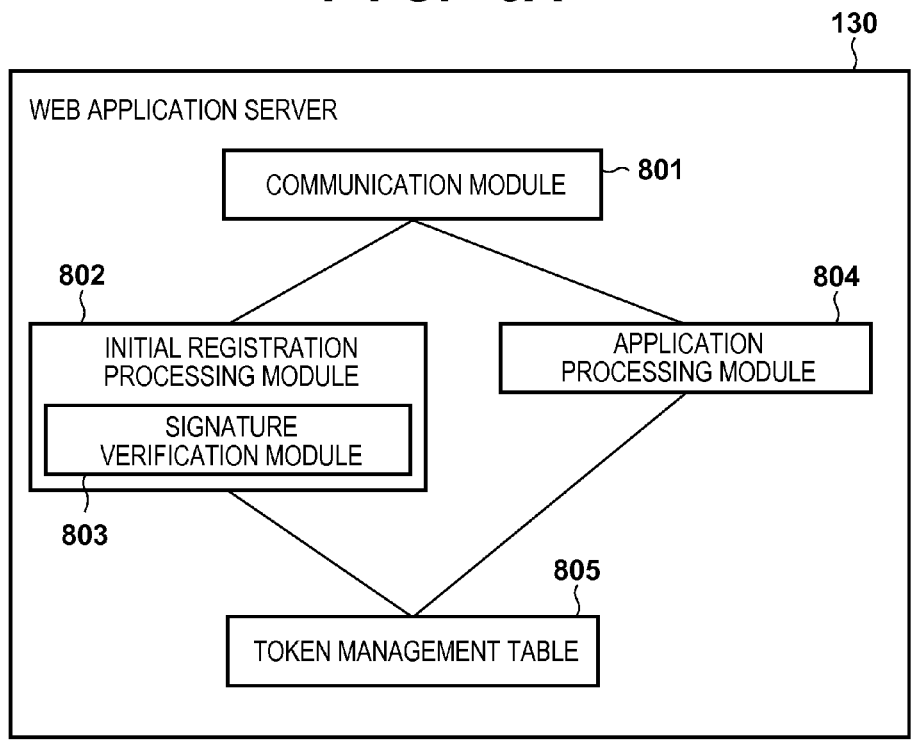
FIG. 8A is a diagram illustrating the software module configuration of a web application server according to the embodiment.
FIG. 8B is a diagram schematically illustrating an example of a token management table according to the embodiment.

FIG. 8A is a diagram illustrating the software module configuration of the web application server 130 according to the present embodiment. These software modules are held in the HDD 304 of the web application server 130, and the functions of the software modules are realized by being deployed into the RAM 302 at the time of execution and executed by the CPU 301.

In the present embodiment, in response to a request from the MFP 110 using the HTTP protocol, the web application server 130 returns HTML content to be displayed in the web browser 705 of the MFP 110, content for operating the MFP 110, and so on. At that time, it is determined whether or not the request is from an MFP 110 in which a properly-purchased dummy application is installed, but this method will be described later.

A communication module 801 accepts requests by communicating with an external device over a network, and distributes the requests to an initial registration processing module 802 and an application processing module 804 in accordance with a specified URL. The initial registration processing module 802 carries out initial registration for the accessing MFP. The initial registration processing module 802 includes a signature verification module 803 that verifies a signature contained in the received request. The signature verification module 803 contains the public key corresponding to the secret key in the file 511 of the dummy application illustrated in FIG. 5B, and digitally-signed signature information can be verified using this secret key.

The application processing module 804 returns HTML content to be displayed by the web browser 705 of the MFP 110, content for operating the MFP 110, and so on. A token management table 805 is a database that manages device IDs registered in the web application server 130 in association with tokens (authorization information). The token is a random character string issued when the initial registration processing module 802 initially registers the MFP. An MFP is considered to be a properly-registered MFP in the case where a token contained in a request from the MFP is registered in the token management table 805.

FIG. 8B is a diagram schematically illustrating an example of the token management table 805 according to the embodiment.

Column 811 indicates the token, column 812 indicates the device ID, and column 813 indicates a validity period (expiration date) of the token as a date. The token is determined to be invalid in the case where the current date is past the date indicated by the validity period.

Next, a process through which the web application server 130 according to the present embodiment determines whether or not a license has been properly purchased on the basis of the dummy application from the MFP 110 will be described.

First, the flow of a process carried out when the web application is executed for the first time after the dummy application has been installed will be described. The following particularly describes a method for registering the MFP for which a license has been properly purchased in the web application server 130 and a method for verifying a request from the MFP 110 to the web application server 130.

To use the web application, a user first launches the menu application 704 of the MFP 110. To display a menu, the menu application 704 inquires with the application management module 703 and obtains a list of installed applications.

Figure 9:
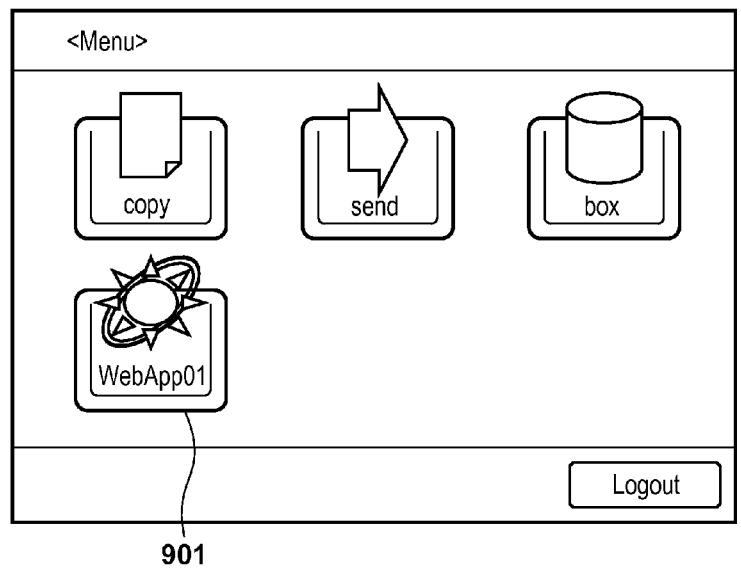
FIG. 9 is a diagram illustrating an example of a GUI displayed in a console unit of the MFP according to the embodiment.

FIG. 9 is a diagram illustrating an example of a GUI displayed in the console unit 111 when the menu application 704 of the MFP 110 is called. Here, the dummy application for calling the web application, indicated in FIG. 5B, is installed in the MFP 110.

A GUI button 901 is a GUI button for calling the dummy application indicated in FIG. 5B.

Figure 10:
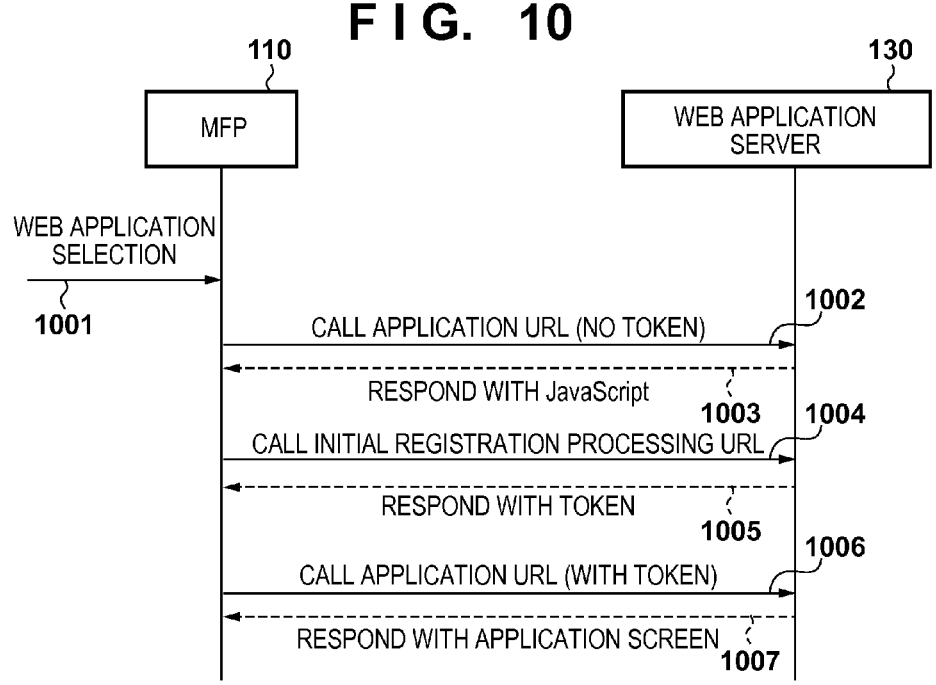
FIG. 10 is a sequence chart for describing a sequence from when a user specifies a GUI button to when a web browser displays web application content in the MFP according to the embodiment.

FIG. 10 is a sequence chart for describing a sequence from when the user specifies the GUI button 901 to when the web browser 705 displays web application content in the MFP 110 according to this embodiment.

In 1001, upon the menu application 704 accepting the pressing of the GUI button 901, the menu application 704 notifies the application management module 703 that the application is to be executed.

Processing carried out by the application management module 703 at this time will be described below.

Figure 11:
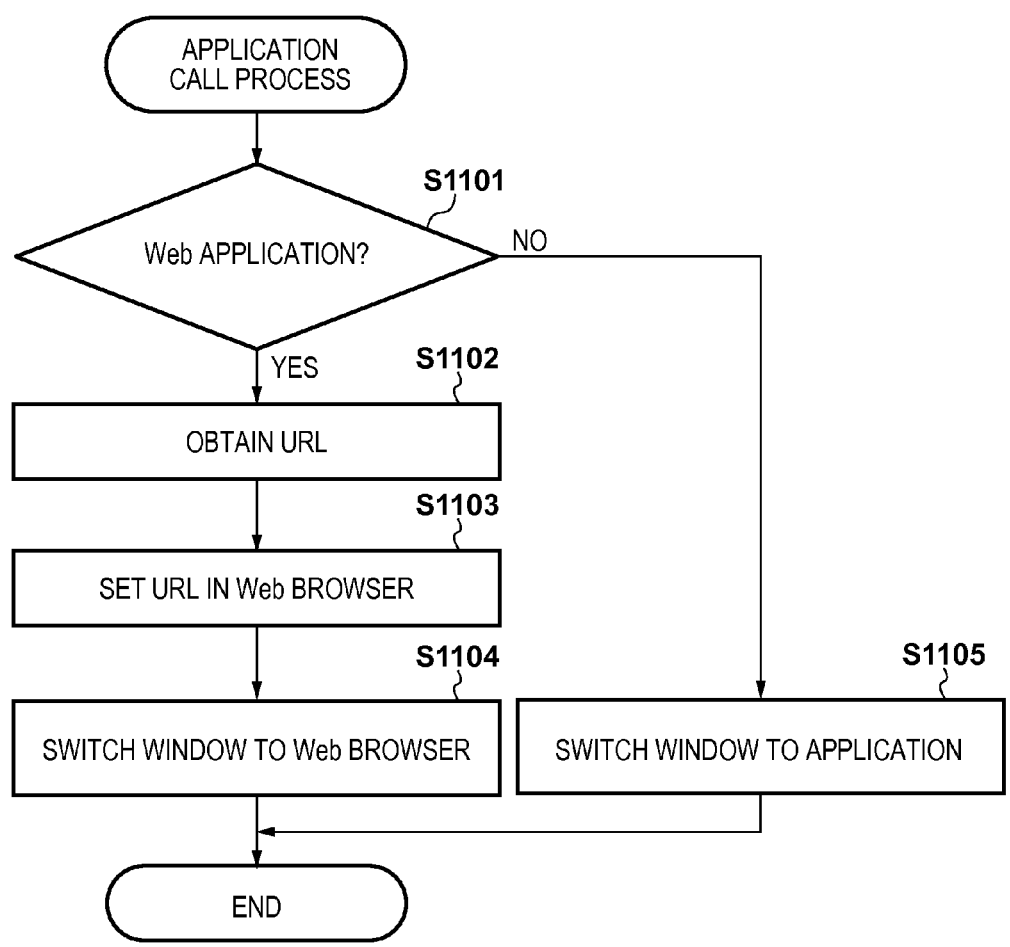
FIG. 11 is a flowchart for describing processing executed in the case where an application management module of the MFP has accepted an application call, according to the embodiment.

FIG. 11 is a flowchart for describing processing executed in the case where the application management module 703 of the MFP 110 has accepted the application call, according to this embodiment. Note that the programs that execute this processing are installed in the HDD 204, and are deployed into the RAM 203 at the time of execution and executed under the control of the CPU 201. As such, this processing will be described as being carried out by the CPU 201.

In step S1101, the CPU 201 determines the type of the application specified in the screen illustrated in FIG. 9. Here, it is determined whether or not the GUI button 901 has been specified and the dummy application called, for example. In the case where the GUI button 901 has been specified, the web application is determined to have been specified and the process advances to step S1102; when such is not the case, however, the process advances to step S1105. In step S1102, the CPU 201 obtains a URL of the web application from the dummy application files. For example, with the dummy application indicated in FIG. 5B, the file 512 is loaded and a URL for calling the application processing module 804 of the web application server 130 is obtained. The process then advances to step S1103, where the CPU 201 sets the URL obtained in step S1102 in the web browser 705. The process then advances to step S1104, where the CPU 201 switches the display in the console unit 111 from the menu application 704 to a GUI window of the web browser 705, and ends the process.

Meanwhile, in step S1105, the web application has not been specified, and thus the CPU 201 switches the display in the console unit 111 from the menu application 704 to a GUI window of a specified application that can be run on the MFP 110, such as copy, send, or the like, for example. After this, the process ends.

A screen of the application specified by an icon in the menu screen illustrated in FIG. 9 can be displayed through the process described above. In particular, when the GUI button 901 of the web application is specified, the URL of the web application server 130 can be accessed in order to call the web application.

Returning to FIG. 10, in 1002, the web browser 705 makes a request to the web application server 130 using the HTTP protocol. This is done as a result of the URL in the file 512 (FIG. 5B) being set in the web browser 705 in step S1103 of the flowchart illustrated in FIG. 11. Having accepted this request, the communication module 801 of the web application server 130 passes the request to the application processing module 804. Processing carried out by the application processing module 804 at this time will be described below.

FIG. 12 is a flowchart for describing processing, executed in the case where the application processing module 804 of the web application server 130 has received an HTTP request, that determines whether or not the request is from a properly-registered MFP 110, according to this embodiment. Note that the programs that execute this processing are installed in the HDD 304, and are deployed into the RAM 302 at the time of execution and executed under the control of the CPU 301. As such, this processing will be described as being carried out by the CPU 301.

First, in step S1201, the CPU 301 obtains header information contained in the HTTP request from the MFP 110. The process then advances to step S1202, where the CPU 301 obtains a token from the header information obtained in step S1201 and inquires with the token management table 805. The process advances to step S1203 in the case where the token has been successfully obtained and a record corresponding to the token has been successfully obtained from the token management table 805, whereas the process advances to step S1205 when such is not the case. In step S1203, the CPU 301 confirms the validity period of the token on the basis of the record obtained in step S1202. In the case where the current date is determined to be within the validity period, the process advances to step S1204, whereas when such is not the case, the process advances to step S1206. In step S1204, the CPU 301 determines that the MFP 110 is a properly-registered MFP, and returns content corresponding to the device ID in the record obtained in step S1202, after which the process ends.

On the other hand, step S1205 corresponds to a case where there is no token or an improper request has been accepted, and thus the CPU 301 returns content containing JavaScript for confirming the license of the MFP, after which the process ends. Details of the JavaScript for confirming the license will be given later.

Meanwhile, step S1206 corresponds to a case where a request containing a token whose validity period has expired has been received, and thus the CPU 301 returns content for displaying, to the user, the validity period expiry of the token.

Through this processing, the web application server 130 determines whether or not a content request is from a registered MFP, and returns the content to the MFP in the case where the content request is a proper request.

Returning once again to FIG. 10, in 1003, the application processing module 804 returns content containing JavaScript for confirming the license. This is done to make a request to the MFP 110 in order to confirm the license, in the case where there is no token in the request using HTTP protocol made in 1002 and the process illustrated in the flowchart of FIG. 12 has advanced from step S1202 to step S1205. Having received this response, the web browser 705 executes the JavaScript. Processing carried out by the web browser 705 at this time will be described next.

Figure 13:
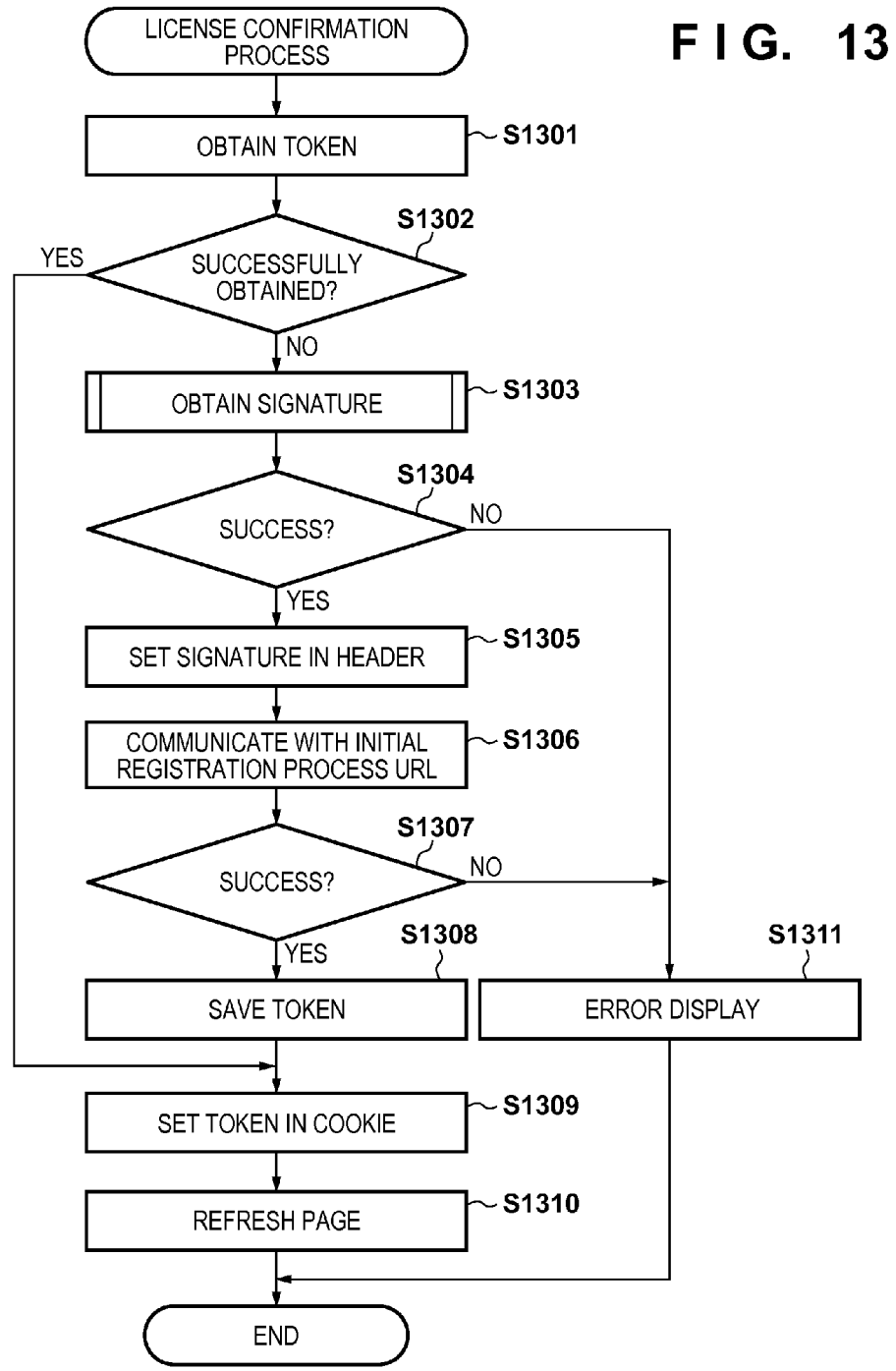
FIG. 13 is a flowchart for describing processing, written in JavaScript for confirming a license of an MFP, that is executed by a web browser of the MFP according to the embodiment.

FIG. 13 is a flowchart for describing processing, written in JavaScript for confirming the license of the MFP, that is executed by the web browser 705 of the MFP 110 according to the embodiment.

First, in step S1301, the web browser 705 makes a request for a token to the application management module 703. At this time, the application management module 703 compares the current URL of the web browser 705 with the URL in the file of the dummy application. The token held in correspondence with the dummy application is passed to the web browser 705 in the case where the URLs match. In step S1302, the web browser 705 determines whether or not the token has been successfully obtained in step S1301. The process advances to step S1309 in the case where it is determined that the token has been successfully obtained, whereas the process advances to step S1303 when such is not the case. In step S1303, the web browser 705 makes a request for a signature to the application management module 703. Processing carried out by the application management module 703 at this time will be described below.

Figure 14:
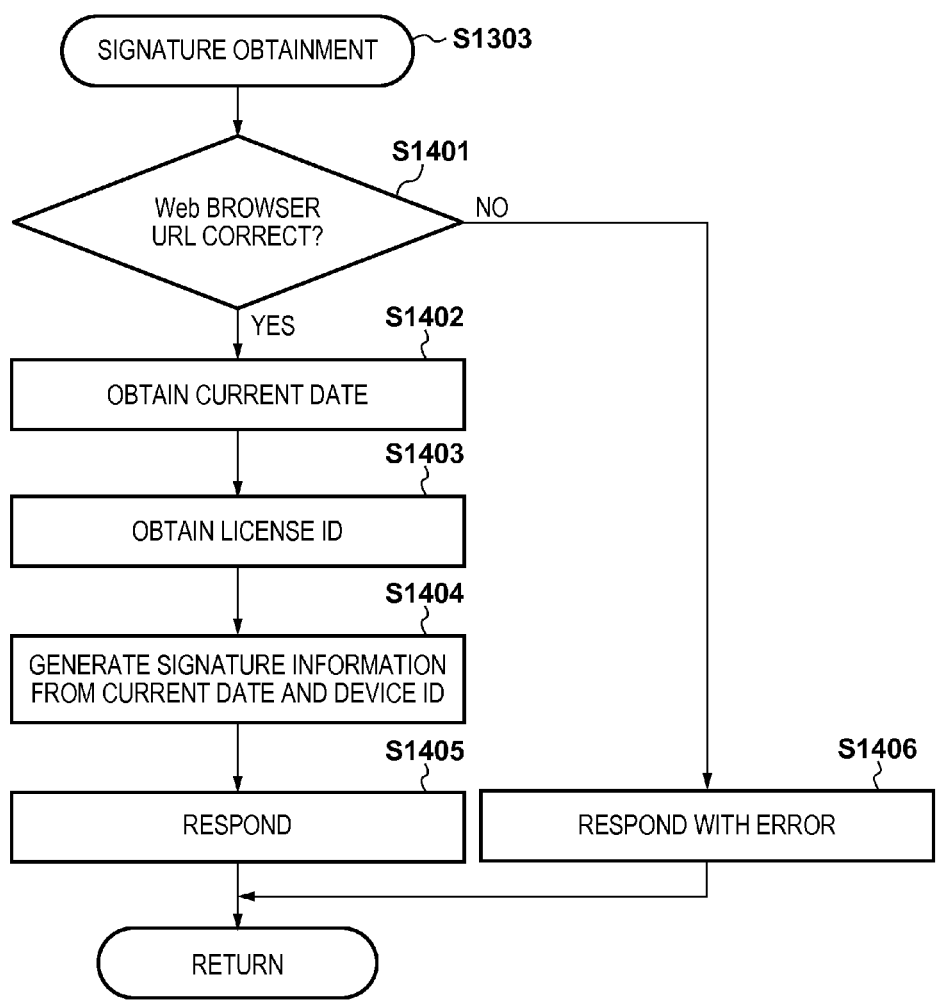
FIG. 14 is a flowchart for describing a signature obtainment process carried out by the MFP according to the embodiment in step S1303 of FIG. 13.

FIG. 14 is a flowchart for describing a signature obtainment process carried out by the MFP 110 according to the embodiment in step S1303 of FIG. 13. Note that the programs that execute this processing are installed in the HDD 204, and are deployed into the RAM 203 at the time of execution and executed under the control of the CPU 201. As such, this processing will be described as being carried out by the CPU 201.

First, in step S1401, the CPU 201 compares the current URL of the web browser 705 with the URL in the file of the dummy application. In the case where the URLs match, the URL is determined to be the correct URL, and the process advances to step S1402; however, when such is not the case, the process advances to step S1406, an error is returned, and the process ends. In step S1402, the CPU 201 obtains the current date from the operating system of the MFP 110. The process then advances to step S1403, where the CPU 201 obtains the device ID set uniquely for the MFP 110. The process then advances to step S1404, where the CPU 201 generates signature information that has been digitally signed using the secret key of the web application in the file of the dummy application. Here, the signature information includes the current date obtained in step S1402, the device ID obtained in step S1403, and the expiry date determined at the time of installation. The process then advances to step S1405, where the CPU 201 passes the current date, the device ID, the expiry date, and the signature information to the web browser 705, after which the process ends.

Returning to FIG. 13, next, in step S1304, the web browser 705 determines whether the signature information has been successfully obtained in step S1303. In the case where it is determined that the obtainment has succeeded, the process advances to step S1305, whereas when such is not the case, the process advances to step S1311. In step S1305, the web browser 705 sets the current date, device ID, expiry date, and signature information obtained in step S1303 in the header portion of an HTTP request. The process then advances to step S1306, where the web browser 705 sends the HTTP request configured in step S1305 to an initial registration URL. The process then advances to step S1307, where it is determined whether or not the communication of step S1306 has succeeded. In the case where it is determined that the communication has succeeded, the process advances to step S1308, whereas when such is not the case, the process advances to step S1311. In step S1308, the web browser 705 passes, to the application management module 703, a token returned in the case where the communication of step S1306 has succeeded. As a result, the application management module 703 saves the received token in association with the URL. The process then advances to step S1309, where the web browser 705 saves token information in a cookie associated with the current URL. As a result, the token is added to subsequent requests as cookie information and is passed to the web application. The process then advances to step S1310, where the web browser 705 refreshes the current page, after which the process ends. Meanwhile, step S1311 corresponds to a case where the signature has failed, and in this step, an error display is carried out and the process ends.

The foregoing is a process carried out by the web browser 705 using JavaScript.

The descriptions will now return once again to FIG. 10. In 1004, an initial registration process URL is called, as described with reference to the flowcharts in FIGS. 13 and 14. Here, the MFP 110 has not yet obtained a token, and thus it is determined in step S1302 of FIG. 13 that the token cannot be obtained. Then, the signature information in which the current date, the device ID, and the expiry date have been digitally signed using the secret key in the file 511 of FIG. 5B is generated through the process illustrated in the flowchart of FIG. 14. Then, in 1006, the web browser 705 of the MFP 110 makes an HTTP request to the initial registration process URL. Having accepted this request, the communication module 801 of the web application server 130 passes the request to the initial registration processing module 802. Processing performed by the initial registration processing module 802 at this time will be described below.

Figure 15:
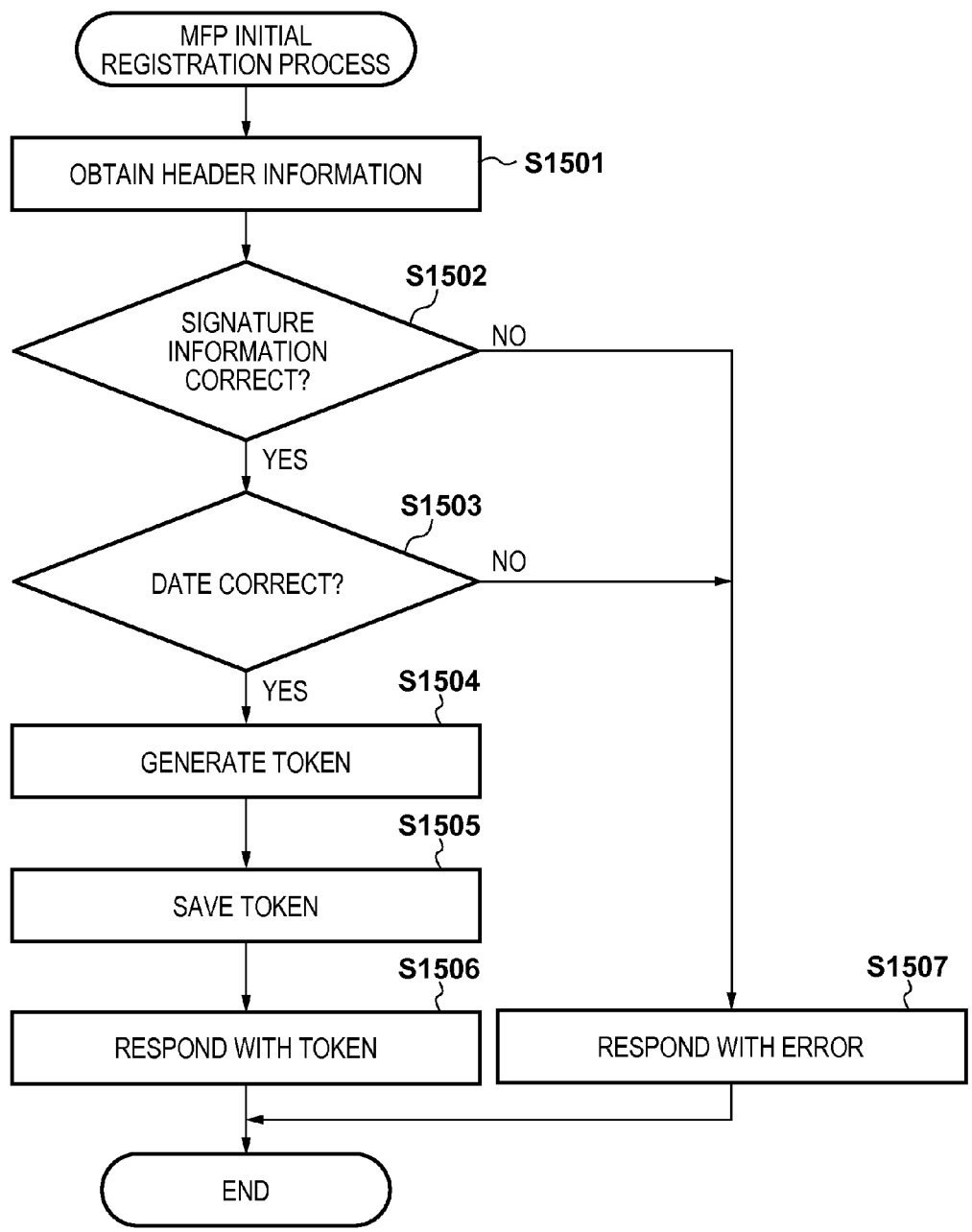
FIG. 15 is a flowchart for describing an MFP registration process executed in the case where a web application server has received an HTTP request from the MFP, according to the embodiment.

FIG. 15 is a flowchart for describing an MFP registration process executed in the case where the initial registration processing module 802 of the web application server 130 has received an HTTP request from the MFP 110, according to this embodiment. Note that the programs that execute this processing are installed in the HDD 304, and are deployed into the RAM 302 at the time of execution and executed under the control of the CPU 301. As such, this processing will be described as being carried out by the CPU 301.

First, in step S1501, the CPU 301 obtains the date, the device ID, the expiry date, and the signature information from the header information of the HTTP request. The process then advances to step S1502, where the CPU 301 verifies the date, the device ID, the expiry date, and the signature information from the header information obtained in step S1501. In step S1502, the CPU 301 determines whether or not the verification has succeeded; in the case where the verification has succeeded, the process advances to step S1503, whereas when such is not the case, the process advances to step S1507. In step S1503, the CPU 301 determines whether or not the date obtained in step S1501 is correct. Here, the determination as to whether or not the date is correct is made on the basis of whether or not a difference from a current date in the web application server 130 is within a predetermined amount of time. In the case where it is determined that the date is correct, the process advances to step S1504, whereas when such is not the case, the process advances to step S1507. Step S1504 corresponds to a case where the CPU 301 has determined that the request is from an MFP in which the correct dummy application is installed, and thus the CPU 301 generates a token for that MFP. The process then advances to step S1505, where the CPU 301 registers the generated token in the token management table 805. The process then advances to step S1506, where the CPU 301 returns the generated token to the MFP 110 that made the request, after which the process ends. Meanwhile, in step S1507, the initial registration process has failed, and thus the CPU 301 returns an error to the MFP 110 that made the request, after which the process ends.

The foregoing has described the initial registration process carried out by the initial registration processing module 802.

Returning once again to FIG. 10, in 1005, the web application server 130 carries out the initial registration process and generates the token through the process illustrated in the flowchart of FIG. 15. The token is then returned to the web browser 705 of the requester. When the token is returned in this manner, the web browser 705 determines whether or not the token has been successfully obtained in step S1307 of FIG. 13.

Next, in 1006, the web browser 705 makes a request to the web application server 130 using the HTTP protocol through the process of step S1310 in FIG. 13. At this time, the cookie contained in the HTTP request includes the token. Then, in 1007, the web application content is returned upon it being determined that the token is correct through the processes of step S1202 and step S1203 of FIG. 12. The foregoing has described a sequence leading up to the web application content being displayed in the web browser 705 for the first time.

According to this embodiment, the web application server 130 verifies the license based on whether or not information signed using the secret key of the dummy application installed in the MFP 110 is correct. Whether or not to register the MFP 110 in the web application server 130 can then be determined. In other words, it is possible to reject requests from an MFP in which the dummy application has not been installed as a result of purchasing the application. It is not necessary for the MFP 110 to communicate with the license management server 120 at this time.

Meanwhile, when the web application is called for the second and subsequent times, it is determined that the token is saved through the process of step S1202 in FIG. 12, and thus the initial registration process is not carried out. By issuing the token when the web browser 705 of the MFP is registered in this manner, a signature is not required each time a request is made from the web browser 705, and the license can be verified.

Meanwhile, in the case where the validity period of the purchased web application has expired, the token is determined to be invalid in step S1203 of FIG. 12, and content indicating that the validity period has expired is returned. Accordingly, the user of the MFP 110 can be prompted to carry out a process such as purchasing a license to extend the validity period.

Although the foregoing embodiment describes the application management module 703 of the web application server 130 carrying out the signature process, the dummy application may have a software configuration that includes a program for executing the signature obtainment process illustrated in FIG. 14.

Furthermore, the configuration may be such that the dummy application includes a program for executing a process that calls the application in the case where the application is determined to be the web application, such as that illustrated in FIG. 11.

In addition, in the MFP 110 according to the aforementioned embodiment, the registration process is carried out through JavaScript received from the web application server 130. However, for example, software may be configured so that the dummy application holds JavaScript and the web browser 705 is caused to load that JavaScript.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-150134, filed Jul. 23, 2014, which is hereby incorporated by reference herein in its entirety.

What is claimed is:

1. An information processing apparatus having a web browser for calling and executing a web application from a web server, the information processing apparatus comprising:
 a memory device that stores a set of instructions; and
 at least one processor that executes the set of instructions to function as:
 (1) a first reception unit configured to receive a first application including (a) a configuration file group for registering the web application and (b) a license file of the first application from a license management server, wherein the first application includes (i) a URL of a web application and (ii) a secret key of the web application;
 (2) an instruction receiver configured to receive an instruction for calling the web application via the first application;
 (3) a generation unit configured to generate signature information that has been digitally signed using the secret key of the web application included in the first application;
 (4) a transmission unit configured to transmit, to the web server, the signature information generated by the generation unit; and
 (5) a second reception unit configured to receive, from the web server, data based on a result of a verification by the web server using the signature information.

2. The information processing apparatus according to claim 1, wherein the at least one processor further executes the set of instructions to function as:

a first determination unit configured to determine whether or not a URL of the web browser matches the URL of the web application included in the first application, wherein, in a case that it is determined by the first determination unit that the URL of the web browser matches the URL of the web application, the generation unit generates the signature information using the secret key of the web application, and the transmission unit transmits the signature information to the web server.

3. The information processing apparatus according to claim 1, wherein the second reception unit receives authorization information for indicating permission to use the web application in accordance with it having been determined by the web server that the signature information transmitted by the transmission unit is correct, and wherein the second reception unit receives error information for indicating an error in accordance with it having been determined by the web server that the signature information transmitted by the transmission unit is incorrect.

4. The information processing apparatus according to claim 3, wherein the at least one processor further executes the set of instructions to function as:

a registering unit configured to register the authorization information received by the second reception unit; and a request unit configured to, in accordance with calling for the web application, request the web application and the authorization information registered by the registering unit for the web server.

5. The information processing apparatus according to claim 3, wherein the first reception unit further receives a second application including (a) an execution file group for a program that is able to be run on the information processing apparatus and (b) a license file of the second application from the web server.

6. The information processing apparatus according to claim 5, wherein the at least one processor further executes the set of instructions to function as:

a second determination unit configured to determine, in a case that an application is called, whether the application is the first application or the second application; and a switching unit configured to set the URL included in the first application in the web browser to (a) switch a screen to a window of the web browser in accordance with it having been determined that the first application is called, and (b) switch the screen to a window of the second application in accordance with it having been determined that the second application is called.

7. A non-transitory computer-readable storage medium on which is stored a program for causing a computer to function as an information processing apparatus having a web browser for calling and executing a web application from a web server, the information processing apparatus comprising:

a memory device that stores a set of instructions; and at least one processor that executes the set of instructions to function as:

(1) a first reception unit configured to receive a first application including (a) a configuration file group for registering the web application and (b) a license file of the first application from a license management server, wherein the first application includes (i) a URL of a web application and (ii) a secret key of the web application;

(2) an instruction receiver configured to receive an instruction for calling the web application via the first application;

(3) a generation unit configured to generate signature information that has been digitally signed using the secret key of the web application included in the first application;

(4) a transmission unit configured to transmit, to the web server, the signature information generated by the generation unit; and (5) a second reception unit configured to receive, from the web server, data based on a result of verification by the web server using the signature information.

8. The non-transitory computer-readable storage medium according to claim 7, wherein the at least one processor further executes the set of instructions to function as:

a first determination unit configured to determine whether or not a URL of the web browser the URL of the web application included in the first application, wherein in a case that it is determined by the first determination unit that the URL of the web browser matches the URL of the web application, the generation unit generates the signature information using the secret key of the web application, and the transmission unit transmits the signature information to the web server.

9. The non-transitory computer-readable storage medium according to claim 7, wherein the second reception unit receives authorization information for indicating permission to use the web application in accordance with it having been determined by the web server that the signature information transmitted by the transmission unit is correct, and wherein the second reception unit receives error information for indicating an error in accordance with it having been determined by the web server that the signature information transmitted by the transmission unit is incorrect.

10. The non-transitory computer-readable storage medium according to claim 9, wherein the at least one processor further executes the set of instructions to function as:

a registering unit configured to register the authorization information received by the second reception unit; and a request unit configured to, in accordance with calling for the web application, request the web application and the authorization information registered by the registering unit for the web server.

11. The non-transitory computer-readable storage medium according to claim 7, wherein the first reception unit further receives a second application including (a) an execution file group for a program that is able to be run on the information processing apparatus and (b) a license file of the second application from the web server.

12. The non-transitory computer-readable storage medium according to claim 11, wherein the at least one processor further executes the set of instructions to function as:

a second determination unit configured to determine, in a case that an application is called, whether the application is the first application or the second application; and a switching unit configured to set the URL included in the first application in the web browser to (a) switch a screen to a window of the web browser in accordance with it having been determined that the first application is called, and (b) switch the screen to a window of the second application in accordance with it having been determined that the second application is called.

\* \* \* \* \*